United States Patent [19]
Schroeder

[11] Patent Number: 5,131,900
[45] Date of Patent: Jul. 21, 1992

[54] CREASING AND SLITTING MACHINE FOR TRAVELLING WEBS

[75] Inventor: Lothar Schroeder, Altenmoor, Fed. Rep. of Germany

[73] Assignee: Peters Maschinenfabrik GmbH, Fed. Rep. of Germany

[21] Appl. No.: 658,772

[22] Filed: Feb. 21, 1991

[30] Foreign Application Priority Data

Feb. 21, 1990 [CH] Switzerland ............... 00565/90

[51] Int. Cl.5 .................. B31B 1/16; B31B 1/25; B31F 1/10; B26D 5/02
[52] U.S. Cl. ...................... 493/355; 83/479; 483/54
[58] Field of Search ............... 493/354, 355; 83/479; 29/568

[56] References Cited

U.S. PATENT DOCUMENTS

| | | | |
|---|---|---|---|
| 2,187,211 | 1/1940 | McKinley et al. | 83/482 |
| 2,393,586 | 1/1946 | Bruker | 83/864 |
| 3,332,326 | 7/1967 | Haas | 493/363 |
| 3,408,886 | 11/1968 | David | 83/9 |
| 3,478,407 | 11/1969 | Fenstermaker et al. | 29/240 |
| 3,489,043 | 1/1970 | Dent | 83/9 |
| 3,587,374 | 6/1971 | Stewart et al. | 83/479 |
| 4,142,455 | 3/1979 | Coburn | 83/479 |
| 4,327,620 | 5/1982 | Greinke et al. | 83/479 |
| 4,413,541 | 11/1983 | Biggar | 83/479 |
| 4,627,831 | 12/1986 | Hirakawa et al. | 493/337 |

FOREIGN PATENT DOCUMENTS 1627297 11/1970 Fed. Rep. of Germany .
2306296 10/1976 Fed. Rep. of Germany .
2905803  8/1979 Fed. Rep. of Germany .
2244620  4/1975 France .
2072563 10/1981 United Kingdom .

Primary Examiner—William E. Terrell
Attorney, Agent, or Firm—Hill, Van Santen, Steadman & Simpson

[57] ABSTRACT

A machine for creasing and slitting a travelling web, such as a cardboard web, characterized by an assembly which includes a carriage having a tool storage device with at least one spare tool and a lever arm mounting a tool for rotation. The lever arm is movable from a position with the tool engaging the web passing through the machine to a withdrawn position which enables changing the tool with one of the spare tools. Each of the assemblies is adjustably positioned in a transverse direction relative to the direction of movement of the web. The device includes a second group of assemblies which contains counter-tools for the tools of the first group.

18 Claims, 5 Drawing Sheets

CREASING AND SLITTING MACHINE FOR TRAVELLING WEBS

BACKGROUND OF THE INVENTION

The present invention concerns a machine for creasing and slitting of a travelling web, such a machine having means designed for setting the operating position of the tools perpendicular to the travelling direction of the web, at least one storage device with at least one spare tool, means for transferring a tool from an operating to a spare position and back and means for rotatably driving the tool while in the operating position.

It is an established fact that such a machine can, for instance, be situated after a corrugator and is part of a continuous line of machines which will transform a web of a paper wound up in reels into a continuous web of corrugated board. At the outlet of the corrugator, the web thus produced is slit, for instance, into two webs, whereupon each web is cut crosswise into sheets. The sheets are then taken one-by-one to a cutting machine which is designed for shaping box blanks, cases or other forms of packages therefrom.

In a machine for slitting and creasing, every changeover to a new run of sheets to be produced requires a replacement of certain slitting and creasing tools with other tools and repositioning of every tool in the crosswise direction, that is to say perpendicular to the travelling direction for the web to be processed.

In order to adapt the machine to the size of the new run of sheets and for reasons of production which, in the present case, essentially refer to the corrugator, serious consideration must be given to the possibility of very quick replacement and repositioning of the tools, for example changeover of the processing size and a degree of dispensing from varying the speed of the corrugator.

Numerous solutions have already been put forth with a view to reduce the time required for changing operation sizes. As both the slitting and the creasing operations are achieved ordinarily by means of a tool and an appropriate counterpart, such tools have, up to now, generally been fitted on a first rotary shaft and the counterpart on a second rotary shaft that extends parallel to the first shaft with adjustable distance between the axes of the two shafts. The tools and their counterparts which are simply referred to as "tools" hereinafter, are fitted so as to be shifted and set in a fixed position on the respective shafts, as required by the size of the blanks or the width of the web to be produced. Moreover, a similar processing station can be made up, either with a single pair of shafts on which the tools and counterparts are fitted for slitting and creasing purposes or else with two pairs of shafts, one of which carries the tools and the slitting counterparts and the other pair which has the creasing tools.

Hereinafter, it will be admitted that a slitting and creasing station includes at least a rotary tool and a rotary counterpart between which the web will travel as it is processed. Consequently, it can be noticed that among the solutions put forth up to now with a view for accelerating the step of changeover of the operation sizes, almost all consist in fitting at least one more pair of shafts as spare shafts and also equipped with tools and counterparts in the vicinity of the pairs of shafts in the operating position, for example so that the web will pass through the operating pair of shafts as well as the pair of shafts that are for the spare tools. So, with the changeover of the operating size, the pair of shafts in the operating position will be shifted into another "spare" or retracted" position whereas the spare shaft pair is shifted into an operating position. These shafts can be shifted into and out of the operating position with a crosswise motion, as described, for example, in German Patent Document 23 06 296, or with a circular motion, as disclosed in U.S. Pat. No. 3,489,043.

Further propositions envisaged two operating stations arranged in the web travelling direction with the rollers of the station being necessarily in the operating position, whereas the other rollers of the second station are kept in the spare position and vice-versa. This arrangement is disclosed, for example, in U.S. Pat. No. 3,408,886 and French Patent Document 2 244 620.

All of these solutions have, however, the following drawbacks:

There is no possibility to adjust the operating pressure between the tool and its counterpart fitted on a pair of shafts independently from one of the other pairs of tools fitted on the same shaft. In fact, this pressure cannot be the same for all tools, since it originates actually from the strength with which the two shafts are pressed against one another.

A second disadvantage is that with a pair of shafts in the operating position, there is no possibility to vary the crosswise portion of a tool counterpart with regard to its tool.

A third disadvantage is that, since all of the tools of one and the same shaft pair are compulsorily to move simultaneously from an operating to a spare or retracted position and back, the number of possible combinations of the tools usable within a machine is relatively small.

SUMMARY OF THE INVENTION

The object of the present invention is to produce a machine for slitting and creasing a moving web, which machine provides a vast range of possibilities for the selection of tools, the pressure to be applied on each tool pair and the relative position of every tool and counterpart. These purposes are reliably obtained in an improvement to a machine for creasing and slitting a travelling web, which machine includes means for setting the operating position of the tools perpendicular to the travelling direction of the web, at least one storage device with at least one spare tool, means for transferring a tool between the operating position to the spare position and means for rotatably driving the tool while in the operating position.

The improvements are that the machine includes at least one carriage which has means for shifting in a perpendicular direction to the direction of travel of the web. This carriage is provided with both the storage device with at least one spare tool and with a lever which is suitable with regard to the carriage between a first position in which it holds the tool in an operating position and a second position which is retracted from the operating position at which the one tool may be transferred for a spare tool of the storage device.

In one embodiment, the tool, which is being used for operating on the web, is being carried by this lever and is moved between the first and second position and the storage device is either a carousel or turret mounted on the carriage and having a position for holding at least one spare tool and also a position for receiving an additional tool, such as the tool being used in the operating station.

In a second embodiment, the lever arm is constructed as providing a tool turret carrying at least one spare tool and the operating tool, which turret can be rotated when the lever is in a retracted position to present or exchange tools.

Other advantages and features of the invention will be readily apparent from the following description of the preferred embodiments, the drawings and claims.

DESCRIPTION OF THE PREFERRED EMBODIMENTS

Figure 1:
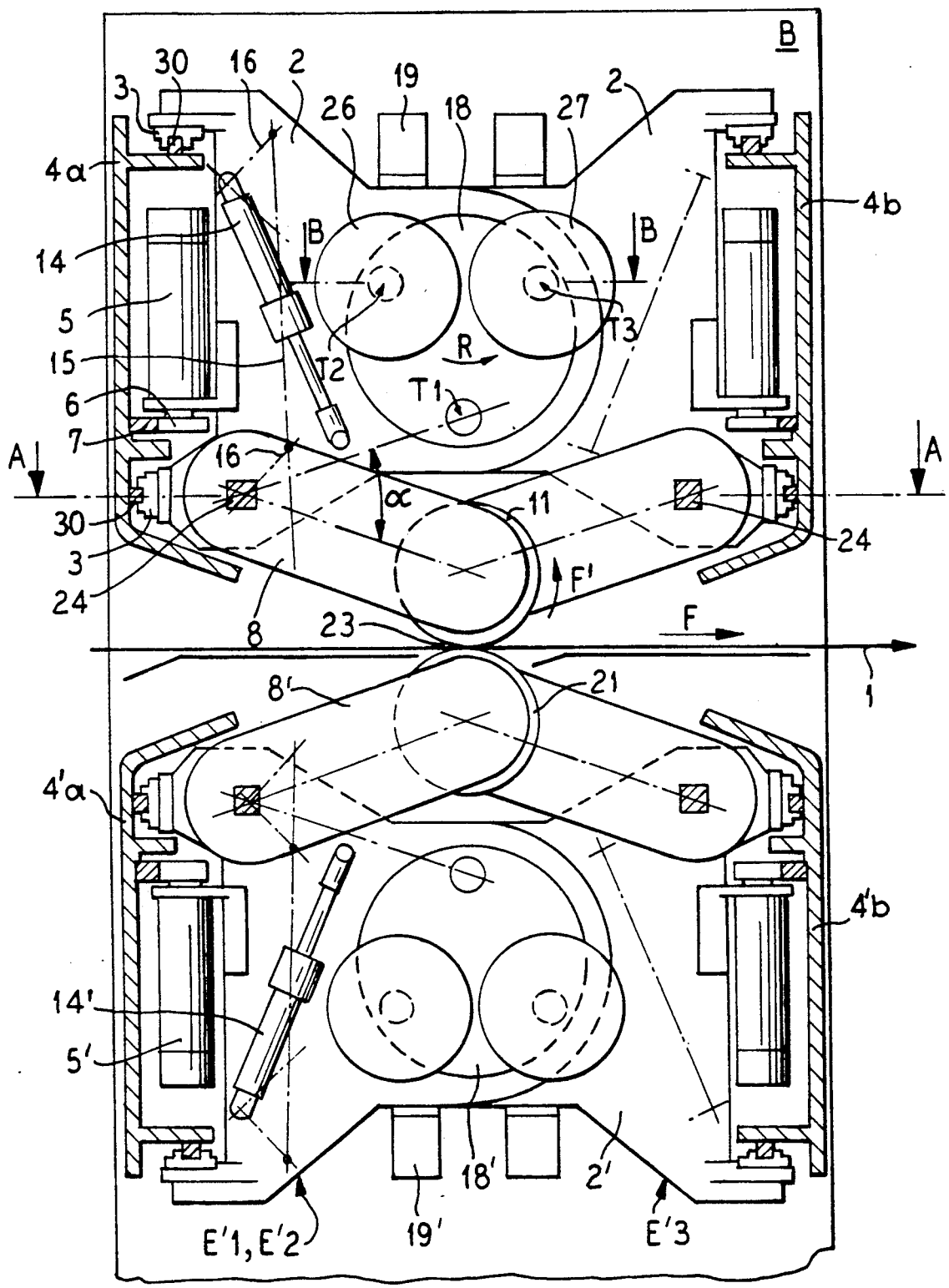
FIG. 1 is a cross sectional view of a first embodiment of a machine, which is taken along the direction of a web travelling through the machine with portions in elevation for purposes of illustration, showing a tool and a counterpart as they are arranged.

The principles of the present invention are particularly useful when incorporated in a device for processing a web 1 of FIG. 1 which is moving in a direction of arrow F in FIG. 1 through the device. The direction F, which is the direction of movement of the web, will be referred to as the travelling direction in the following description and a direction along the line extending perpendicular to the plane of FIG. 1, which is also perpendicular to this direction F, will be referred to as a crosswise or perpendicular direction.

The device has a frame which includes two lateral walls B which are aligned to extend parallel to each other and to the travelling direction F. Between these two lateral walls B, the web 1 moves ordinarily in a horizontal position and the web 1 is destined, for instance, to be slit by rotary tools 11 situated on top of the web and by rotary counterparts 21 situated beneath the web.

Both walls B are connected to one another by two pairs of cross walls 4a, 4b, 4'a and 4'b, of which one pair 4a, 4b is situated above the web 1 and the other pair 4'a and 4'b is situated below the web 1. The wall 4a of the upper pair is situated upstream from the tool 11 with regard to the travelling direction and the other wall 4b is considered as a downstream wall. The same designation applies to walls 4'a and 4'b, which are beneath the web 1.

Considering the machine referred to, the description will be directed to the part situated on top of the web and it should be understood that the part beneath the web will be essentially identical to the one on top and symmetrically arranged with regard to the latter.

The upstream wall 4a includes two crosswise rails or tracks 30, along which a carriage 2 may slide for positioning the tool 11. The carriage 2 is provided with two guides 3 which are engaged on the rails or tracks 30. The carriage 2 with a relatively reduced crosswise width extends as far as the vicinity of the downstream wall 4b. A motor 5 is mounted on the carriage 2. The motor has an output axle which is provided with a toothed wheel or gear 6 that engages a rack gear 7 which is mounted on a downstream facing surface of the wall 7a. Rotation of the gear 6 by the motor 5 will shift the carriage along the rack with the guides slipping along the tracks 30. Thus, this forms means for shifting the carriage in a crosswise direction or a direction which is perpendicular to the direction F of movement of the web through the device.

The carriage 2 is provided with a bore 34 (see FIG. 2) which receives and supports a hollow shaft or sleeve 31, of which one end 31' protrudes from the bore 34. The end 31' is to hold a first end of a tilting lever 8 for free rotation on a smooth bearing shell 35. Another end of the lever 8 is provided with a bore 99 which contains a bearing 36 that holds a rotatable mandrel 10 which is destined to receive a tool 11. The tool is fitted on the mandrel 10 by means of a bayonet system or joint in which two catches 37 of the tool 11 are held within helical grooves 38 which are made radially on an inner surface of the bore of the mandrel 10. If the tool 11 is rotated backward or forward, it can be locked in a position or unlocked with regard to the mandrel 10 and the locking direction is contrary to the direction of operational rotation F' (FIG. 1) of the tool 11. On a second end of the mandrel 10, which is opposite the tool 11, a gear 10' (FIG. 2) is rotatably mounted and keyed to the mandrel.

The shaft 31 has a hollow bore 39 which contains two bearing shells 33, 40 which support a hollow sleeve 32 for rotation. The hollow sleeve 32 has a non-circular bore for receiving a complementary non-circular shaft 24. As illustrated, the shaft has a square cross section and, therefore, the bore is also of a square cross section. The mounting of the shaft in the bore is accomplished, with two bearing shells (not represented) to enable a lateral shifting of the sleeve 32 on the shaft 24. The shaft 24 has its ends mounted in the two lateral walls B, with one end being connected to means for rotating the shaft so that a gear 41 mounted on the shaft and connected by means of a toothed belt 9 to the gear 10' can rotate the tool 11 attached thereto.

In addition to the arm 8, carriage 2 is provided with a turret 18, which is rotatable around an axis which is parallel to the crosswise direction and is situated half way between the upstream and downstream walls 4a and 4b, respectively. The turret 18 allows for an angular arrangement of two or more spare tolls, such as the tools 26 and 27. Every tool 26 and 27 is fastened on the turret 18 by means of a bayonet joint system including an axle 98 (FIG. 2), which has catches 18a, which will be engaged in helical grooves 11a in a bore 11' of the tool 11. The grooves 11a extend in an opposite direction from the helical grooves 38 so that the mandrel and tool 11 are rotated in opposite directions for engaging the tool on the axle 98 from that for locking the tool on the mandrel.

The lever 8 can be tilted through an angle α (FIG. 1) between two positions, for example a first position in which it holds a tool 11 in contact with the web 1 and a second position in which the bore 11' (FIG. 2) of the tool 11 will be situated exactly opposite the axle 98 of the turret to enable transfer of tools from the mandrel 10 to the turret. To accomplish such a transfer requires a lateral or axial shifting of the lever 8 relative to the carriage 2. To accomplish this, means are provided, which includes a helical groove, indicated by the dotdash line 17 on the interior of the bore 34, which receives a catch 17' on an outer surface of the hollow sleeve 31. Thus, rotation of the sleeve 31 will cause shifting of the sleeve, either backward or forward, along the shaft 24 to shift the lever 8 with regard to the carriage 2. The rotation of the shaft or sleeve 31 is achieved by means of a jack 14, which has one end engaged with the carriage 2 and the other end being attached to the sleeve 31 by means of appropriate levers 15 and 16.

In the course of a creasing action to be carried out along the web of cardboard 1, the tool is rotated. The rotation of the tool is caused by rotating the mandrel 10 having the tool 11 by the drive means, which includes the toothed gear 10' attached to the mandrel, the gear 41 mounted on the square bar 24 and connected by the toothed belt to the gear 10'. The square bar 24, as mentioned above, is mounted for rotation on the two side walls B and has one end connected to a source of rotary motion, such as a drive motor (not illustrated).

If it is admitted that the tool 11 is in the operating position, as represented in FIG. 1, then the two tools 26 and 27 are spare elements on the turret 18 at seats T2 and T3, respectively. Thus, the seat T1 is in a transfer position and is free to receive the tool 11 when it is being exchanged. In order to replace the tool 11 with the tool 26, the exchange is accomplished in the following manner. The jack 14 is actuated to tilt the lever 8 through the angle α from the working or first position to a position with the bore 11' aligned with the axle 98 of the seat T1. The tool 11 is then rotated in a direction opposite to the operating direction F' in order to disengage the tool 11 from the mandrel 10, which causes an axial movement of the tool to engage the inlet of the bore 11' of the tool 11 with the free end of the axle 98 of the seat T1 of the turret 18. The tool is then rotated to complete the disengagement from the mandrel 10 and its engagement on the axle 98 due to the coaction of the bayonet system, including the catches or projections 18a acting in the grooves 11a. After the tool 11 is carried on the transfer to the station T1, the turret 18 is rotated by means of a motor 19 (FIG. 4), which is mounted on the carriage 2 and rotates a drive worm assembly 20 to rotate the turret in a direction of arrow R (FIG. 1) in order to move the seat T2 and its tool 26 into the transfer position. It should be noted that other drive arrangements, for example a pneumatic latch, could be utilized for rotating the turret. After the turret 18 has been rotated to present the tool 26 in the transfer position, the tool 26 is transferred to the lever 8 and then the lever 8 is tilted in order to have the tool moved into the operating position, i.e., in contact with the web 1, by means of identical operation, but in the contrary direction to those carried out for having the tool 11 moved form the operating to the transfer position.

In the event the tool 11 has to be replaced with the tool 27 and not the tool 26, then it is obvious than an appropriate rotation of the turret 18 will allow the tool 27 to be moved to the transfer position.

Figure 3:
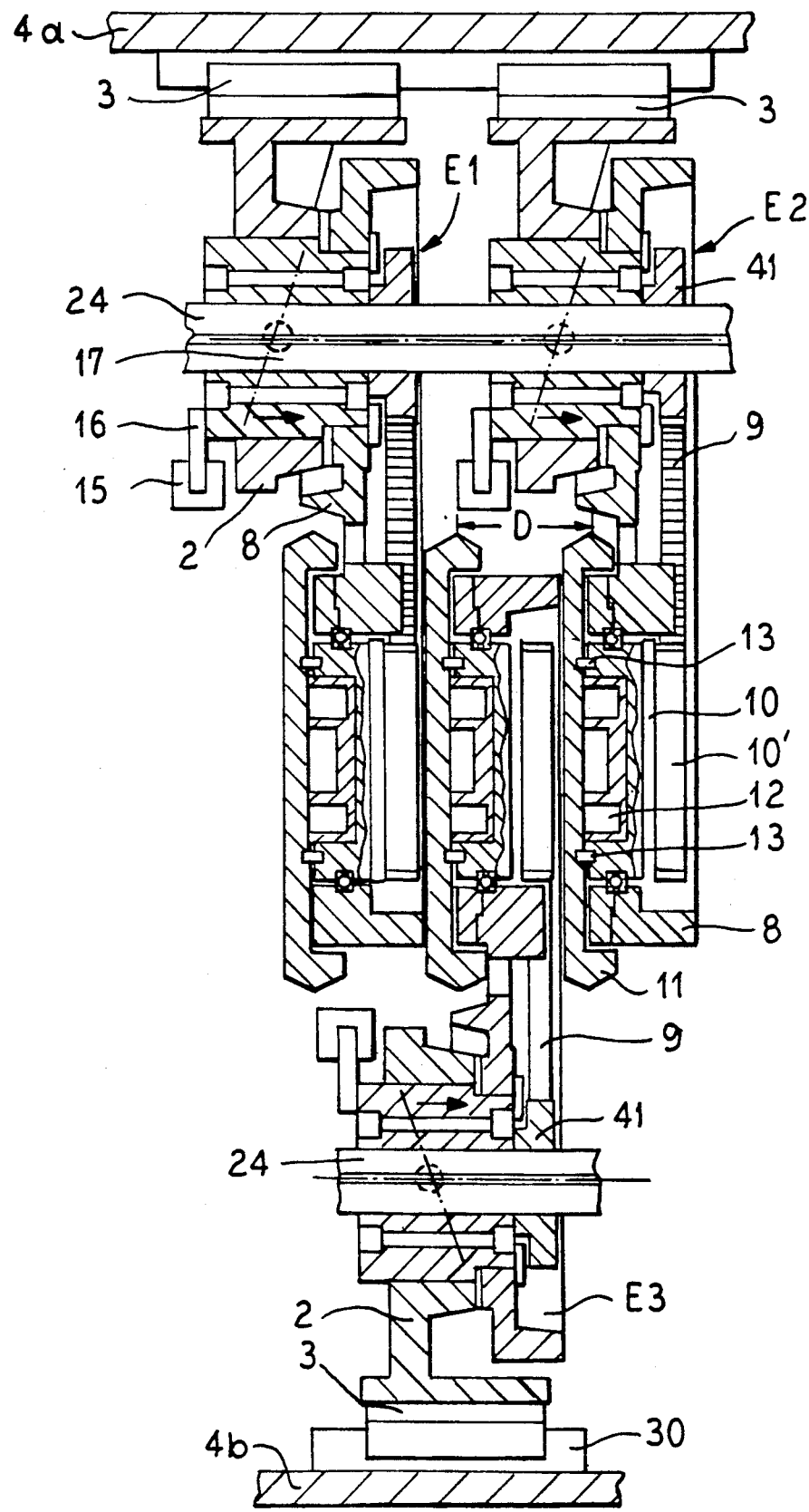
FIG. 3 is a cross sectional view taken along the line A—A of FIG. 1 showing three lever arms containing three tools.

The carriage, with its turret and lever 8 containing a tool, such as 11, form an assembly. A plurality of tools, such as 11, can be spaced in a crosswise direction by providing a plurality of these assemblies. As best illustrated in FIG. 3, two assemblies E1 and E2 are mounted on the upstream wall 4a, while a single assembly E3 is mounted on the downstream wall 4b. It should be noted that the assembly E3 is the same as the assemblies E1 and E2, but is arranged with the parts in an inverse order so that all of the tools are aligned on approximately the same axis above the web 1. By utilizing assemblies on both the upstream and downstream walls, the lateral spacing between two adjacent tools, indicated by the distance D, can be less than the spacing between two adjacent assemblies, such as E1 and E2, on the same wall, such as 4a or 4b. Therefore, it should be understood that each pair of upstream assemblies, such as E1 and E2, will have downstream assembly, such as E3, positioned therebetween, which means that every tool 11 carried by the two consecutive upstream assemblies E1 and E2 will be spaced apart by a tool carried by the downstream assembly, except with the possibility of the two assemblies adjacent the two side walls B.

As illustrated in FIG. 1, as mentioned above, for each of the tool assemblies, such as E1 and E2, a counter-assembly E1' and E2' will be disposed on the lower upstream wall 4'a and for every assembly, such as E3, on the downstream wall 4b will have a counterpart supported by assemblies, such as E'3. These counterpart assemblies E'1, E'2 and E'3 form a second group and are identical to the assemblies E1, E2 and E3 of a first group with regard to the tool 11, though they are symmetrically arranged on the opposite side of the web 1.

Figure 4:
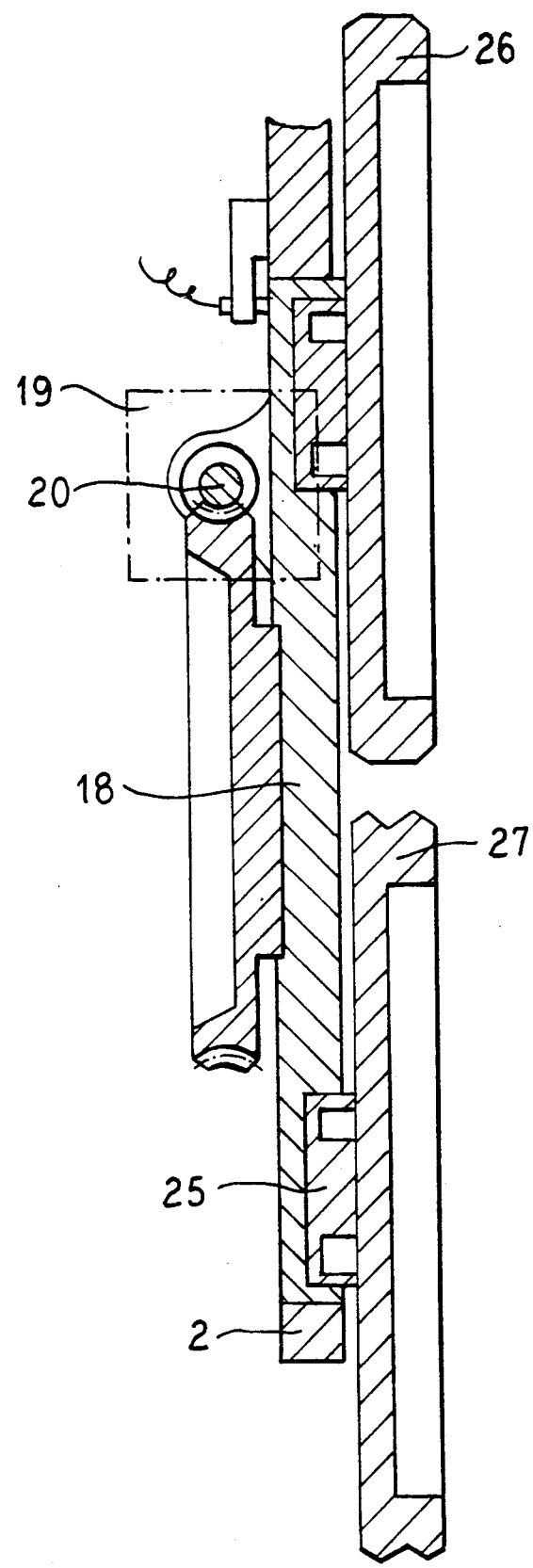
FIG. 4 is a cross sectional view taken along the line B—B of FIG. 1.

In FIG. 3, the tool 11 on the mandrel 10 or on the turret 18 is not fastened by means of a bayonet system, but by means of electro-magnets 12 on the arm 8 and electro-magnets 25 on the turret 18 (see FIG. 4). To accomplish the transfer of tools similar to that of the above bayonet fixture, which is that when the tool is aligned with the appropriate portion on the turret, the magnet, such as 12, on the mandrel 10 is deenergized as the magnet 25 on the turret is energized. To insure alignment and rotation of the tool with the mandrel, catches, such as 13, are provided on the mandrel 10 for engagement in corresponding bores which are provided in each of the tools 11. Thus, the means for locking a tool on either the mandrel or turret can be either electro-magnetic means or can be the bayonet-type joint.

Figure 5:
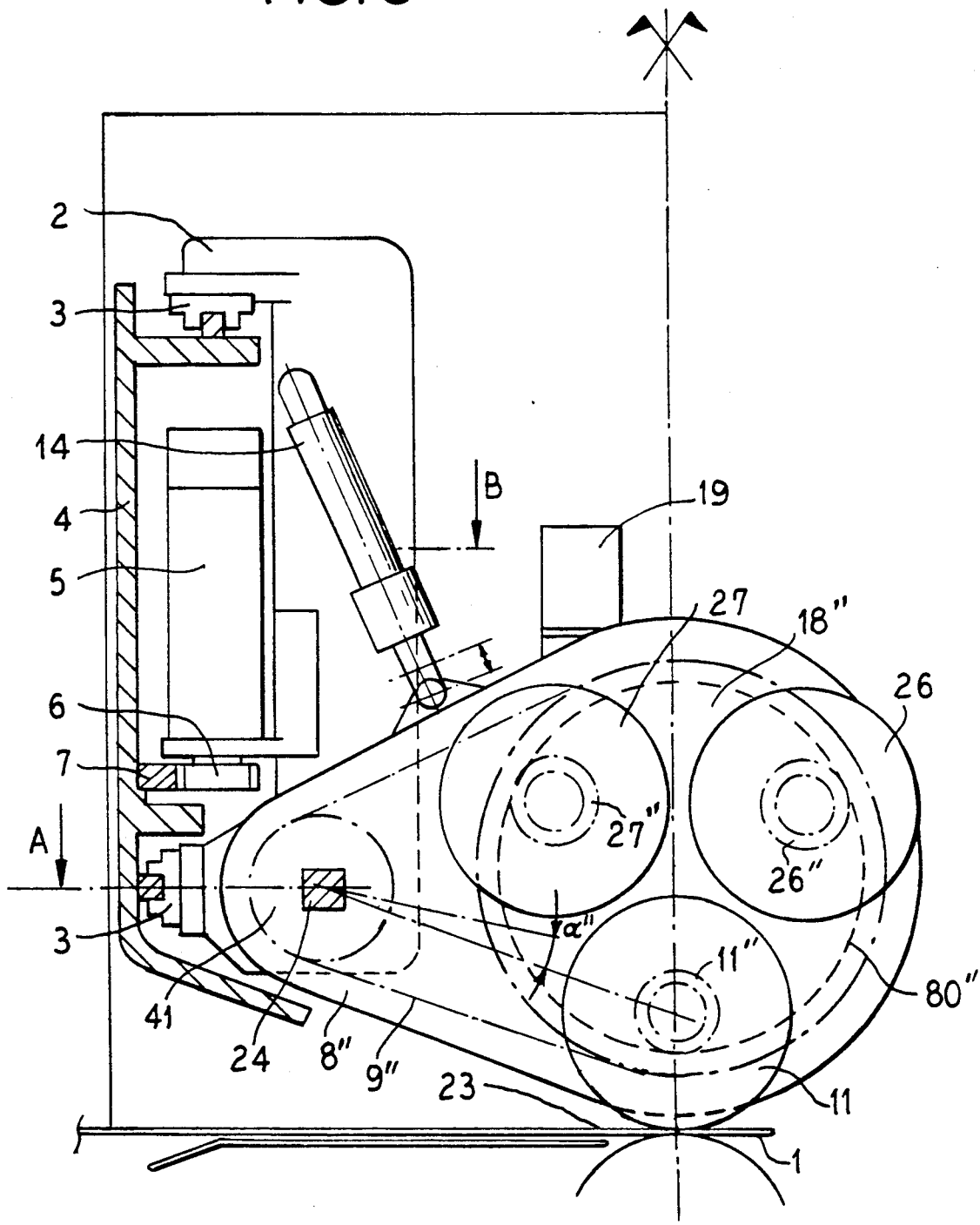
FIG. 5 is a partial cross sectional view similar to FIG. 1 illustrating a second embodiment of the machine of the present invention.

In the second embodiment illustrated in FIG. 5, a tiltable lever 8'' is mounted on the carriage 2 and supports a storage device or turret 18'' at the free end. The storage device carries the tools, 11, 26 and 27, which are mounted on rotatable mandrels. The arm 8'' is shifted between an operating position with the tool, such as 11, engaging the web 1 to a raised position, which is only through a small angle α''. While in the raised position, the turret, such as 28'', can be rotated to present either the tool 27 or 26 in the position of the tool 11.

Every one of the tools 11, 26 and 27 is coaxially connected with a gear, such as 11'', 26'' and 27'', respectively. Each of these gears is engaged with a toothed rim 80'', which is mounted on the lever 8'' for rotation. To drive the rim 80'', a drive arrangement including the gear 41 on the shaft 24 drives a toothed belt 9'' that engages the rim 80''.

Figure 2:
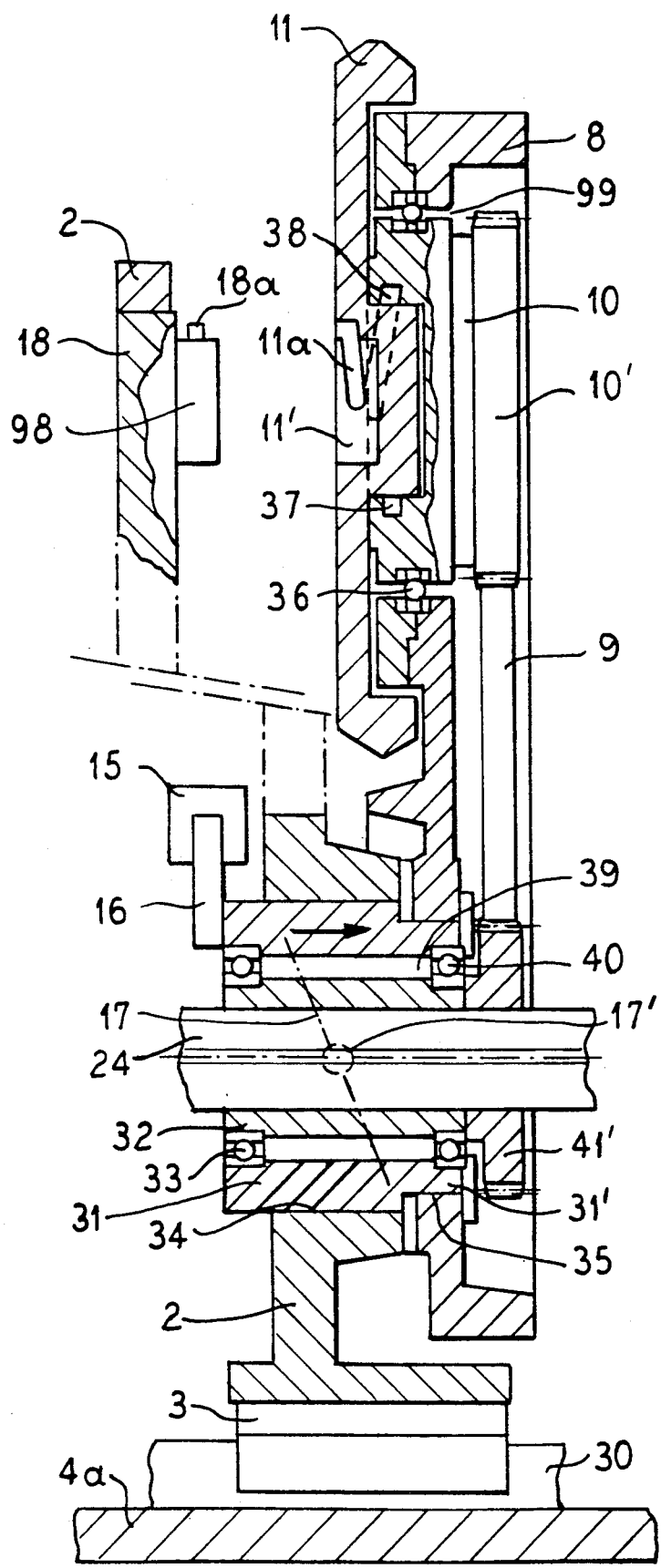
FIG. 2 is a partial cross sectional view taken along the line A—A of FIG. 1 showing a single lever arm with its tools and portion of the carriage containing the storage device.

To prevent all the tools 11, 26 and 27 from turning simultaneously, each of them can be fitted on an eccentric axle, which allows the individual setting of their engagement or non-engagement with the inner tooth portion of the rim 80''. The remaining details of the embodiment of FIG. 5, such as the drive motor 5, are the same as the preceding Figures. For example, the method of fastening each of the tools 11, 26 and 27 with respective drive shaft gears 11'', 26'' and 27'' can be same as shown in FIG. 2, utilizing the bayonet system, such as 11a, 18a, or by utilizing the magnets illustrated in FIGS. 3 and 4.

The invention, as described hereinabove, shows that the number of possible tools or counterpart combinations, with a given number of tools available on a machine about equal to one of the prior art devices, is, by far, higher than the one possible starting with the prior art device. In other words, it will rarely be necessary to dismantle a tool or a counterpart for replacement with another. It is also to individually set the pressure of every tool or counterpart by means of the jack, such as 14 and 14'. It is possible to set, individually and very quickly, the relative position between a tool 11 and its counterpart 21 with the direct help of the motors 5 and 5' used for positioning in the cross-direction of the respective carriages 2 and 2'. It is also noted that the machine's lengthwise space requirement, i.e., along the travelling direction F of the web 1, is reduced to a minimum, not withstanding the maximum number of possible tool combinations. This advantage is also outstanding, since, as mentioned earlier, a machine is frequently a part of a line of machines with the length of the line, which length, if excessive, involves set-up problems.

It is obvious that the number of modifications can be added to the examples disclosed hereinabove without departing from the framework of the invention. So, for instance, in cases where it is appropriate to abstain from placing the creasing and slitting tools along the same crosswise line, it might be envisioned that every seat T1, T2, T3 of the turret 18 has two tools, i.e., one for creasing and one for sitting, and these tools would be available for being transferred simultaneously on the tilting lever 8, which has been constructed for receiving two tools.

Although various minor modifications may be suggested by those versed in the art, it should be understood that I wish to embody within the scope of the patent granted hereon all such modifications as reasonably and properly come within the scope of my contribution to the art.

I claim

1. A machine for creasing and slitting a travelling web, said machine comprising creasing and slitting means including a tool a frame containing first means designed for setting an operating position of the tool in a direction extending perpendicular to a travelling direction of the web, a storage device being positioned in said frame containing at least one spare tool, second means for transferring the tool between the operating position engaging the web and a spare position, and means for rotating the tool when in the operating position, the first means including a carriage, means mounting the carriage in the frame for shifting the carriage to various positions in a direction perpendicular to the travelling direction of the web, said storage device comprising a turret mounted on said carriage and having a plurality of tool seats, and a lever mounted on said carriage for supporting the tool and being movable on the carriage to transfer the tool between a first position with the tool in the operating position engaging the web and a second position at a seat said turret spaced from the web to enable transferring tools between the operating position and said spare position of said storage device.

2. A machine according to claim 1, wherein the means for rotating the tool while in the operating position consist of a bar with an axis extending perpendicular to the travelling direction of the web, said bar being connected to a source of rotational movement to rotate the bar on the axis, a gear being keyed to rotate with said bar, the tool being fitted on a mandrel mounted on said lever for rotation, said mandrel being provided with a second gear so that rotation of the second gear rotates the tool, said lever being pivot able around an axis identical with the axis of said bar and transmission means extending between the two gears to transfer rotary motion from the bar to the mandrel, even during tilting of the lever.

3. A machine according to claim 2, wherein the transmission means consist of a toothed belt extending between the gears.

4. A machine according to claim 2, wherein the means for shifting the carriage crosswise includes a motor mounted on the carriage rotating a gear engaging a rack supported on a crosswise wall of said frame so that rotation of said motor shifts the carriage along said crosswise wall.

5. A machine according to claim 1, wherein the means for mounting the lever on the carriage includes means for shifting the lever along the axis of rotation relative to said carriage t facilitate the transfer of a tool from said lever to the storage device and back.

6. A machine according to claim 5, wherein the means for shifting the lever includes a hollow sleeve received in bore in said carriage, said hollow sleeve being connected to said lever to rotate therewith, said hollow sleeve having an outer surface and the bore having an inner surface, one of said surfaces having a helical groove and the other of said surfaces having a dog received in said helical groove so that rotation of the sleeve with said lever causes the sleeve to shift axially in the bore of said carriage, and means including a jack for rotating said sleeve and lever in said carriage.

7. A machine according to claim 5, wherein the lever has a mandrel mounted for rotation, means being provided on said mandrel and each of the seats of the turret for detachably holding tool thereon, said means for detachably holding including electro-magnets.

8. A machine according to claim 5, wherein the lever has a mandrel mounted for rotation, said mandrel and each of the seats of the turret having means for detachably connecting a tool thereto, said means for detachably connecting comprising means forming a bayonet connection between each tool and the mandrel and a second bayonet connection between each tool and a seat on the turret.

9. A machine according to claim 1, wherein the frame includes two lateral side walls extending parallel to the travelling direction of the web, two cross walls situated respectively upstream and downstream of the tool in the operating position, extending between the two lateral walls, said means for shifting the carriage including guides on the carriage received on rails on one of said cross walls.

10. A machine according to claim 9, wherein each carriage, with its lever and turret, forms an assembly, said assemblies being mounted on the upstream wall and the downstream wall, with the tools being positioned at a half-way point between the two walls and two adjacent assemblies on an upstream wall being separated by an assembly mounted on the downstream wall.

11. A machine according to claim 1, wherein each carriage turret and lever makes up an assembly allowing the dismantle individually from the machine.

12. A machine according to claim 1, which includes a second carriage containing a second storage device and shiftable lever being positioned in the frame on a side of the web opposite to the first-mentioned carriage, said second carriage supporting counterparts for the tool of the first carriage.

13. In a machine for creasing and slitting a travelling web, said machine comprising creasing and slitting including a tool frame containing means designed for setting the operating position of a tool in a direction extending transverse to the travelling direction of the web, at least one storage device for supporting at least one spare tool, means for transferring the tool from an operating position engaging the web to a spare position and means for rotatably driving the tool in the operating position, the improvements comprising the machine including at least one carriage, means for mounting the carriage in said frame for movement in the transverse direction, a lever being mounted on the carriage for moving the storage device between a first position and a second position, said storage device being a turret having several seats for receiving tools, said turret being mounted for rotation on said lever to present one of said several seats to a position for being an operating seat so that when said lever is pivoted to the first position, the tool in the operating seat engages the web and when said lever is pivoted to the second position, the tool in the operating seat is spaced from the web and means for rotating the turret to present different seats at the position of said operating seat when said lever is in the second position.

14. In a machine according to claim 13, wherein said mounted on the carriage expands toward the end containing said turret and the carriage includes means for shifting the lever between the first and second positions.

15. In a machine according to claim 14, wherein the means for rotating the tool in the operating position consists of a bar mounted in the frame to extend perpendicular to the travelling direction of the web, said bar being connected to a source of rotation to rotate the bar on its axis, a gear mounted on said bar to rotate therewith, each of said seats of the turret including a mandrel having a tool mounted thereon for rotation therewith, each of said mandrels being mounted in the turret for rotation and having a gear attached thereto at an end opposite to said tool and transmission means extending between the gear on said bar and each of the gears on said respective tools to transfer rotation of the bar to said mandrels.

16. In a machine according to claim 15, wherein the transmission means consist of a toothed belt extending from the gear on the bar to a rim gear mounted for rotation on said turret, said rim gear having teeth engageable with the gears of said mandrels to rotate.

17. In a machine according to claim 13, wherein the carriage, lever and turret form an assembly, said machine having more than one assembly adjustably mounted in the frame in a transverse direction.

18. In a machine according to claim 17, which includes an additional group assemblies with each assembly being composed of a lever arm, turret, and carriages, said additional group of assemblies being mounted in the machine on a side of the web opposite to the first-mentioned group of assemblies, said second group of assemblies carrying counterparts for coacting with the tools of the first group of assemblies as the web passes between the two groups.

* * * * *